May 10, 1949.  J. D. MUNDY  2,469,699
FISHHOOK REMOVER
Filed Nov. 13, 1945
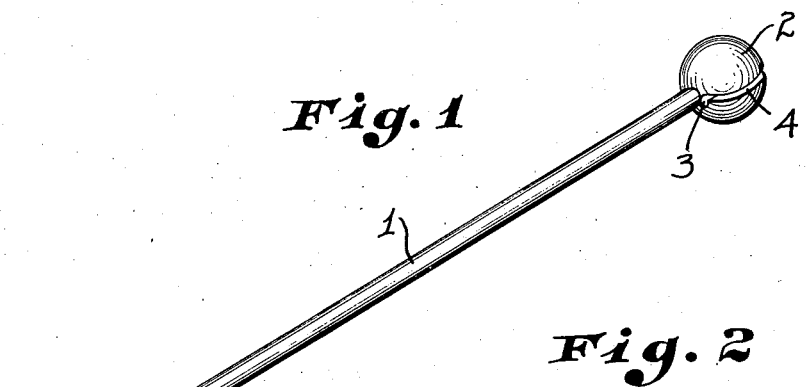
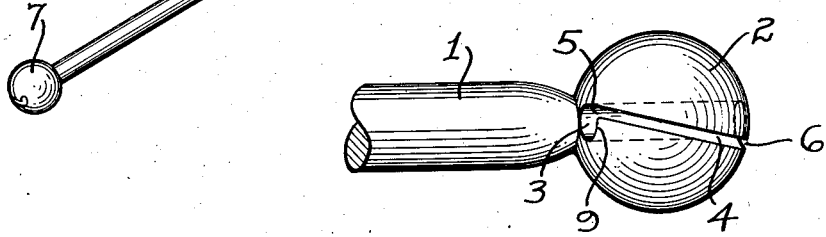
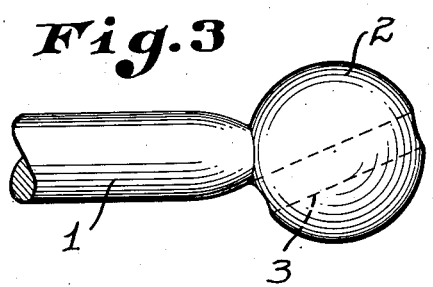
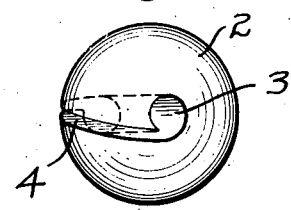
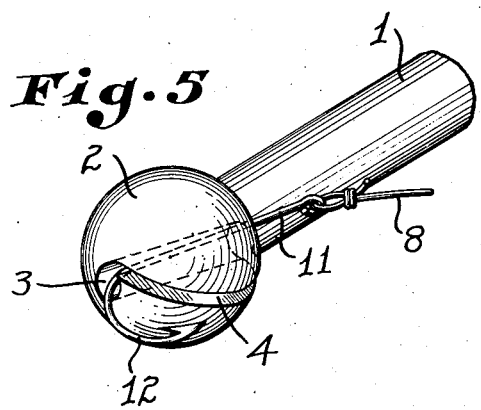
Inventor
John D. Mundy
By Lyon & Lyon
Attorneys Patented May 10, 1949

2,469,699

UNITED STATES PATENT OFFICE 2,469,699

FISHHOOK REMOVER

John D. Mundy, Los Angeles, Calif.

Application November 13, 1945, Serial No. 628,000

1 Claim. (Cl. 43—29)

My invention relates to fish hook removers and more specifically to a device which may be slipped over a fishing line and forced into a fish's mouth or gill to release and remove a fish hook caught therein without injury to the fish.

My invention is useful in the conservation of small fish. Many game laws provide that fish of certain sizes must be returned to the water and not killed. This is almost impossible when a barbed hook is used, as the removal of the barbed hook tears the mouth and gills of the fish sufficiently to kill them.

In general my device consists of a shank or shaft upon which is positioned a ball approximately the size of the fish hook used. A certain arrangement of slots and holes, hereafter to be described, in this ball permit the same to receive the fish hook and so that the curved portion thereof lies over the surface of the ball. This permits the hook to be drawn straight out of the fish without the barb catching and tearing the fish.

Other objects and advantages of my invention will be apparent from the following description of the preferred embodiments thereof.

In the drawings:

Figure 1 is a perspective view showing my fish hook remover.

Figure 2 is a fragmentary enlargement of a plan view.

Figure 3 is a fragmentary enlargement of the reverse side from that shown in Figure 2.

Figure 4 is an end view.

Figure 5 is a fragmentary perspective view showing the operation of my invention.

A hook remover constructed in accordance with my invention comprises a shank or shaft 1 upon which is positioned a ball 2. The ball 2 has a hole therethrough having its axis in a plane of the longitudinal axis of the shank, said axis of the hole also being at an acute angle to a plane including the axis of the shank. The hole 3 is slightly offset from the shank 1. Cut in the perimeter of the ball 2 is a slot 4. This slot 4 is cut at a diagonal to the hole 3 so that the ends of the slot 4 enter the hole 3 at its opposite ends at opposite sides of the hole.

Referring specifically to Figure 2, the slot 4 has its end nearest the shank 1 entering the end of the hole 3 at the left-hand side of the hole 3, while the end 6 at the other end of the slot 4 enters the end of the hole 3 on its right-hand side. The operation of my hook remover as just described is preferably adapted to a right-handed person. When it is to be used for a left-handed person, the direction of the slot 4 and the locality where it enters the hole 3 should be reversed. However, either direction is usable for either a left or right-handed person, but not with the same ease.

In the construction of my device the balls 2 are formed with a radius substantially corresponding to the diameter of the bight of the hook to be removed. The sizes of hooks vary only slightly and one size of ball 2 can be positioned at one end of shank 1 and this ball will fit approximately three different sizes of hooks. A second ball 7 of different size can be positioned at the other end of the shank 1 to accommodate three other sizes of hooks.

To remove a fish hook from the mouth or gill of a fish, the shank 1 is taken in the right hand of a fisherman, while the left hand inserts the leader 8 in the slot 4 and moves it until it enters the hole 3, whereupon the shank 1 is placed in a parallel position to the leader while the leader is held taut. In this position the edges 9 of the hole 3 prevent the leader from being removed through the slot 4. The ball 2 is then moved down the leader 8 until it fits over the shank 11 of the fish hook. A slight push on the shank 1 forces the tissue of the fish to yield until the hook 12 lies substantially against the exterior perimeter of the ball 2, as shown in Figure 5, and a straight pull upon the shank 1 causes the fish hook to be removed without exertion and without further injury to the fish. After the tissue has yielded to the pressure of the ball 2, the hook barb is released as it then fits against the ball 2 preventing it from acting as a projection. By the use of my device, the only injury to the fish is that originally occasioned by the hooking of the fish hook and no injury is occasioned during the removal of the fish hook. It should be clearly noted that the hook 12 lies smoothly against the ball 2 and leaves no projections to catch and tear. The barb portion of the fish hook, when the hook lies smoothly around the ball, cannot catch on the fish tissue.

While I have described the preferred embodiments of my invention, I am not limited to any of the details herein set forth except as described in the following claim.

I claim:

A hook remover comprising a shank and a ball secured to an end of the shank, said ball being provided with a hole therethrough having its axis in a plane of the longitudinal axis of the shank, said axis of the hole also being at an acute angle to a plane including the axis of the shank, said ball having a slot extending from the peripheral surface thereof to the hole and having the portion thereof at the periphery at an angle to the longitudial axis of the hole, the hole and slot being so constructed and arranged that the ends of the slot meet the ends of the hole at the opposite ends of the hole.

JOHN D. MUNDY.

REFERENCES CITED

The following references are of record in the file of this patent:

UNITED STATES PATENTS

| Number | Name | Date |
|---|---|---|
| 1,611,544 | Marus | Dec. 21, 1926 |

FOREIGN PATENTS

| Number | Country | Date |
|---|---|---|
| 10,424 | Great Britain | Aug. 1, 1891 |